United States Patent

[11] 3,604,849

[72] Inventor Ole Skrydstrup
Pierrefonds, Quebec, Canada
[21] Appl. No. 828,536
[22] Filed May 28, 1969
[45] Patented Sept. 14, 1971
[73] Assignee Central Dynamics, Ltd.
Montreal, Quebec, Canada

[54] MIX-EFFECTS SYSTEM FOR TELEVISION VIDEO SIGNALS
19 Claims, 6 Drawing Figs.

[52] U.S. Cl. .......... 178/6.8, 178/DIG. 6, 178/DIG. 30
[51] Int. Cl. .......... H04n 5/24
[50] Field of Search .......... 178/DIG. 6, DIG. 30, 6 PD, 6.8; 328/103, 104, 154; 307/241, 243

[56] References Cited
UNITED STATES PATENTS
2,510,714 6/1950 Patremio .......... 178/7.1

OTHER REFERENCES
Article " Master Control Techniques" by B. Marsden, Journal of the Television Society, Vol. 9 pp. 85- 94

*Primary Examiner*—Robert L. Griffin
*Assistant Examiner*—Richard Eckert, Jr.
*Attorney*—Adams & Ferguson ABSTRACT: A mix/effects system for television video signals is disclosed, the system including a plurality of video sources, a matrix of switching cross points, the input buses of which are respectively connected to said plurality of video sources and the output buses of which are connected to appropriate destination points. Switching circuitry having two input terminals is connected to no more than two of the output buses from said matrix of switching cross points. The switching circuitry also includes two output terminals, the switching circuitry comprising a plurality of switching elements. A mixing amplifier having two input terminals is connected to the two output terminals of the switching circuitry. Circuitry for generating control signals for controlling the energization of the switching elements enables the switching circuit together with the mixing amplifier to provide a wide variety of video signal effects at the output terminal of the mixing amplifier.

INVENTOR
OLE SKRYDSTRUP

BY Addams & Ferguson
ATTORNEYS

PATENTED SEP 14 1971 3,604,849

SHEET 2 OF 3

INVENTOR

OLE SKRYDSTRUP

BY Addams & Ferguson

ATTORNEYS

| MODE | $S_{c1}$ | $S_{c2}$ | $S_{a1}$ | $S_{a2}$ | $S_{b1}$ | $S_{b2}$ |
|---|---|---|---|---|---|---|
| MIX ------------ | 0 | 0 | 1 | 0 | 1 | 0 |
| SPLIT SCREEN --- | 0 | 0 | X | X | X | X |
| KEY OR SPLIT SCREEN INTO MIXER | 0 | 0 | X | 0 | 1 | X |
| BLACK (B BUS) --- | 0 | 0 | 1 | X | 0 | 0 |
| BLACK (A BUS) --- | 0 | 0 | 0 | 0 | 1 | X |
| NON SYNC | 0 | 0 | 1 | 1 | 0 | 0 |
| NON SYNC | 0 | 0 | 0 | 0 | 1 | 1 |
| COLORED KEY ----- | X | 0 | 0 | 0 | 1 | X |

INVENTOR
OLE SKRYDSTRUP

BY Addams & Ferguson
ATTORNEYS

MIX-EFFECTS SYSTEM FOR TELEVISION VIDEO SIGNALS

BACKGROUND OF THE INVENTION

This invention relates to a mix/effects system and, in particular, to such a system including the capability of mixing a special effects signal with one of the video inputs to the system.

Heretofore, mix/effects systems having only two input terminals have had the capability of providing a mix of the two input signals applied thereto or a special effects signal produced from the two applied input signals. However, it has not been possible in such two input terminal systems to provide the capability of mixing the special effects signal with one of the video signals applied to the mix/effects system.

In order to provide this further capability, the prior art systems have had to rely upon four input terminal systems. Since each of the input terminals to the system is normally connected to a bus of a matrix of switching cross points, the necessity of having to provide two additional buses of the cross point matrix in order to provide the additional capability of mixing the special effects signal with one of the video input signals has proven to be uneconomical, inefficient, and undesirable. Further, in both the two-terminal and four-terminal input mix/effects systems of the prior art, it has been necessary to provide nonsynchronous bypass lines. These lines are switched into operation whenever the operator causes two nonsynchronous signals to be mixed, the operation of this aspect of television signal-processing circuitry being well known. The need for these nonsynchronous bypass lines introduced added complexity into the design of the system, this complexity becoming quite extreme in the case of the four-terminal input systems.

SUMMARY OF THE INVENTION

Thus, it is a primary object of this invention to provide a mix/effects system having only two input terminals, which is capable of mixing the two input signals applied thereto, creating a special effects signal therefrom, and, if desired, mixing the special effects signal with one of the two video input signals.

It is a further object of this invention to provide a mix/effects system of the above type where the need for nonsynchronous bypass lines is eliminated.

It is a further object of this invention to provide a mix/effects system of the above type which includes the added capability of producing a color black signal.

It is a further object of this invention to provide a mix/effects system of the above type providing the further capability of producing color mattes for the insertion of colored keys such as titles and the like into background pictures.

Other objects and advantages of this invention will become apparent upon reading the appended claims in conjunction with the following detailed description and the attached drawing.

DETAILED DESCRIPTION OF A PREFERRED EMBODIMENT OF THE INVENTION

Figure 1:
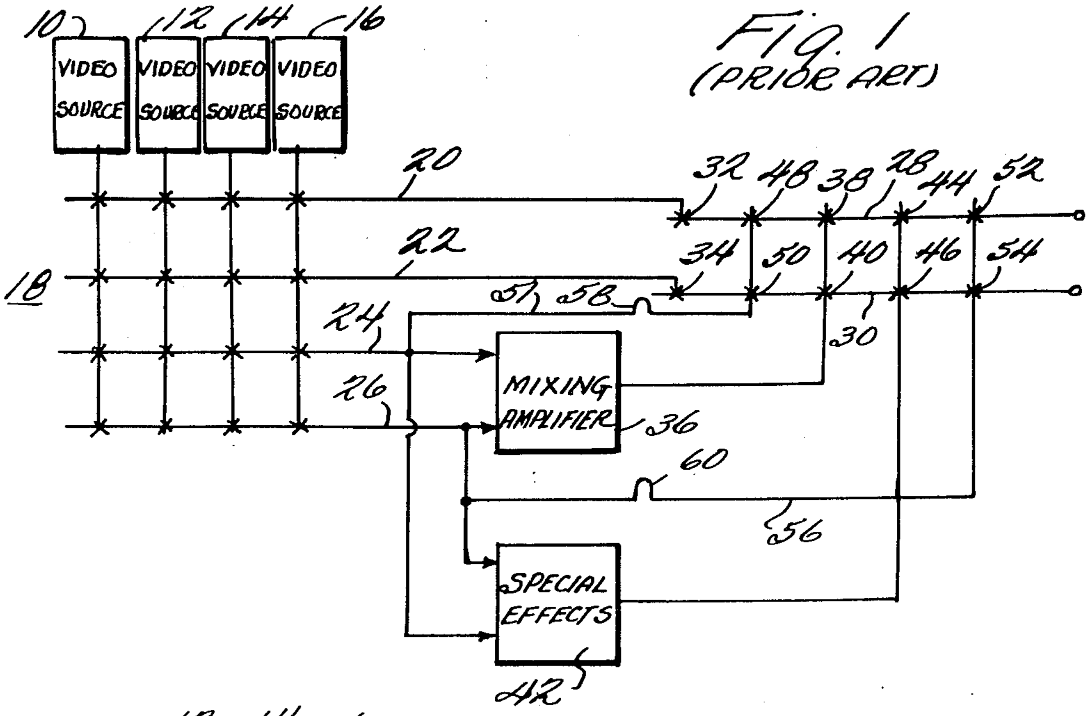
FIG. 1 (PRIOR ART)
FIG. 1 is a combined chematic and block diagram illustrating a two-terminal mix/effects system of the prior art.

Referring to FIG. 1 there is shown a prior art two-bus, mix/effect system for a plurality of video signal sources 10–16. Elements having like numerals in all figures of the drawing have like functions. Sources 10–16 may be television cameras, video tapes, and the cameras may in turn be associated with slide projectors, movie projectors, and the like. These sources are applied to the switching matrix generally indicated at 18, which comprises a matrix of cross points which permit any of the sources 10–16 to be switched to any of the buses 20–26. Bus 28 and bus 30 respectively provide preview and program signals.

Buses 20 and 22 are directly connected to buses 28 and 30 via cross points 32 and 34 to thereby enable any of the sources 10–16 to be directly connected to the buses 28 and 30. Buses 24 and 26 are directly connected to a mixing amplifier 36, the function of which is well known to those of ordinary skill in this art. Mixing amplifier 36 incorporates a fader lever (not shown), the position of which determines the relative proportion at the output of the mixing amplifier of the two signals respectively occurring at buses 24 and 26. Thus, for example, the fader lever can be moved so that the operator can fade from a signal occurring at one of the input buses to the mixing amplifier to the signal occurring at the other input, such fading techniques being well known to those of ordinary skill in this art. The output of the mixing amplifier is connected to buses 28 and 30 at cross points 38 and 40 respectively.

Buses 24 and 26 are also connected to special effects amplifier 42, which in turn is connected to cross points 44 and 46 of buses 28 and 30 respectively. The special effects amplifier is also well known to those of ordinary skill in this art, the basic purpose of the amplifier being to provide split screens, wipes, insertion of keys such as titles and the like. Bus 24 is also connected to buses 28 and 30 via cross points 48 and 30. Further, bus 26 is also connected to cross points 52 and 54 of buses 28 and 30 via line 56. Lines 51 and 56 are referred to as nonsynchronous bypass lines, the purpose of which is known to those of ordinary skill in this art. Basically, the purpose of these lines is to avoid the problem which occurs whenever the operator mixes two nonsynchronous signals at mixing amplifier 36. Thus, there is typically provided circuitry (not shown) which selects either line 51 or line 56 depending on the position of the fader lever of mixing amplifier 36 whenever it is detected that the operator has selected nonsynchronous signals. Hence, the possibility of picture breakup and/or color shift at the television receiver is eliminated. Delays 58 and 60 are respectively provided in lines 51 and 56 to compensate for the delay introduced at mixing amplifier 36.

The mix/effect system of FIG. 1 has proven satisfactory in some instances; however, no provisions is made for applying the output of the special effects circuit 42 to one of the inputs of mixer 36. Further, the need for the nonsynchronous bypass lines with the incorporation of attendant delays 58 and 60 adds to the overall circuit complexity.

Figure 2:
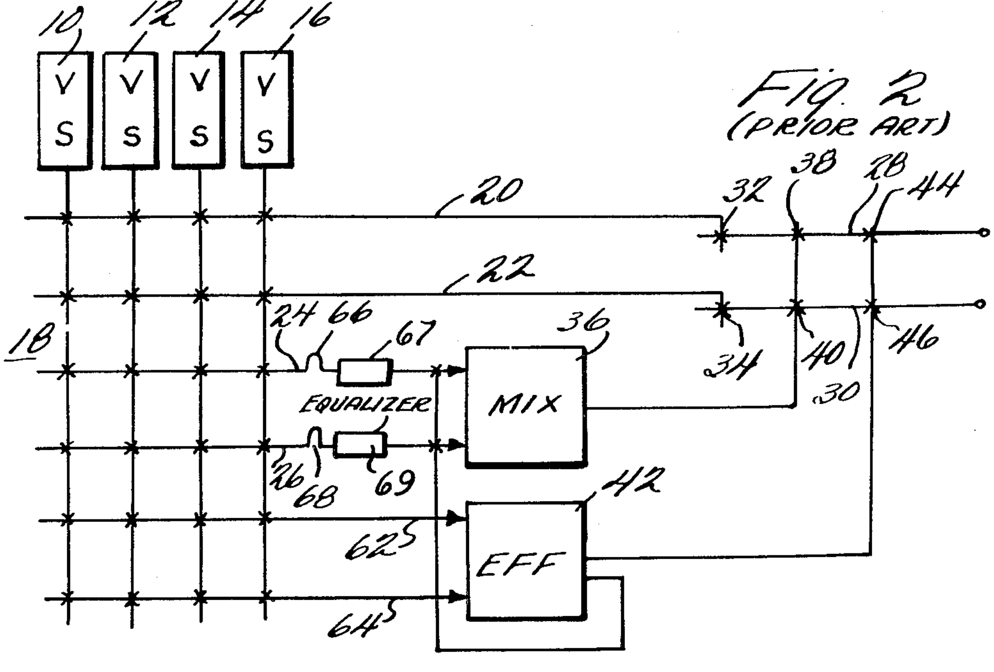
FIG. 2 (PRIOR ART)
FIG. 2 is a combined schematic and block diagram of a four-terminal mix/effects system of the prior art.

Reference should now be made to FIG. 2 which shows a four-bus mix/effect system having the capability of feeding the output of the special effects circuit into the mixing amplifier. Thus, the ability to mix to or from a special-effects-type picture is included in the circuitry of FIG. 2. However, this additional capability is obtained at the cost of additional buses 62 and 64. Further, delay lines 66 and 68 together with equalizers 67 and 69 also have to be respectively incorporated into the buses 24 and 26 to compensate for the additional delay involved whenever the special effects circuit is applied to one of the inputs of the mixer 36. Further, nonsynchronous bypass lines (not shown) corresponding to the lines 51 and 56 of FIG. 1 must also be incorporated into the circuitry of FIG. 2. The nonsynchronous bypass lines are not shown in FIG. 2 because of the complexity of the arrangement necessary in order to effectuate the desired compensation for nonsynchronous mixing. Thus, the complexity of the circuitry of FIG. 2 with respect to the FIG. 1 circuitry is significantly increased as is evident from a comparison of these figures.

Figures 3, 5:
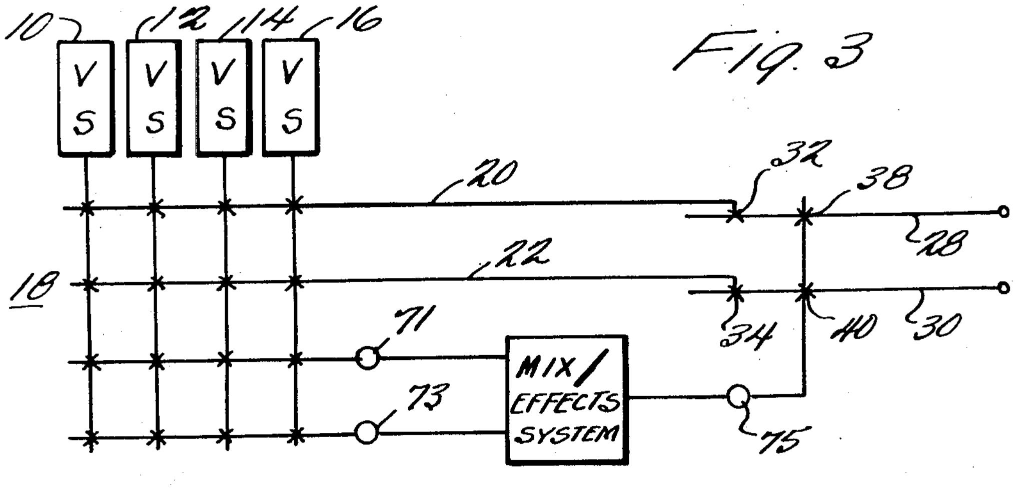
FIG. 3 is a combined schematic and block diagram of an illustrative embodiment of a two-terminal mix/effects system in accordance with the present invention.
FIG. 5 is a table illustrating various modes of operation of FIG. 4A.

Reference should now be made to FIG. 3 which is a four-bus mix/effects system in accordance with the invention having the capability of applying a special effects signal to a mixer. As can be seen from a comparison of FIGS. 1 input 2 the circuitry of FIG. 3 is quite simple when compared with the circuitry of either of these figures. Nevertheless, it performs all the functions that either of the prior art circuits are capable of and in addition it is capable of performing even further functions as will now be brought out with respect to FIGS. 4A, 4B, and 5.

Figure 4A:
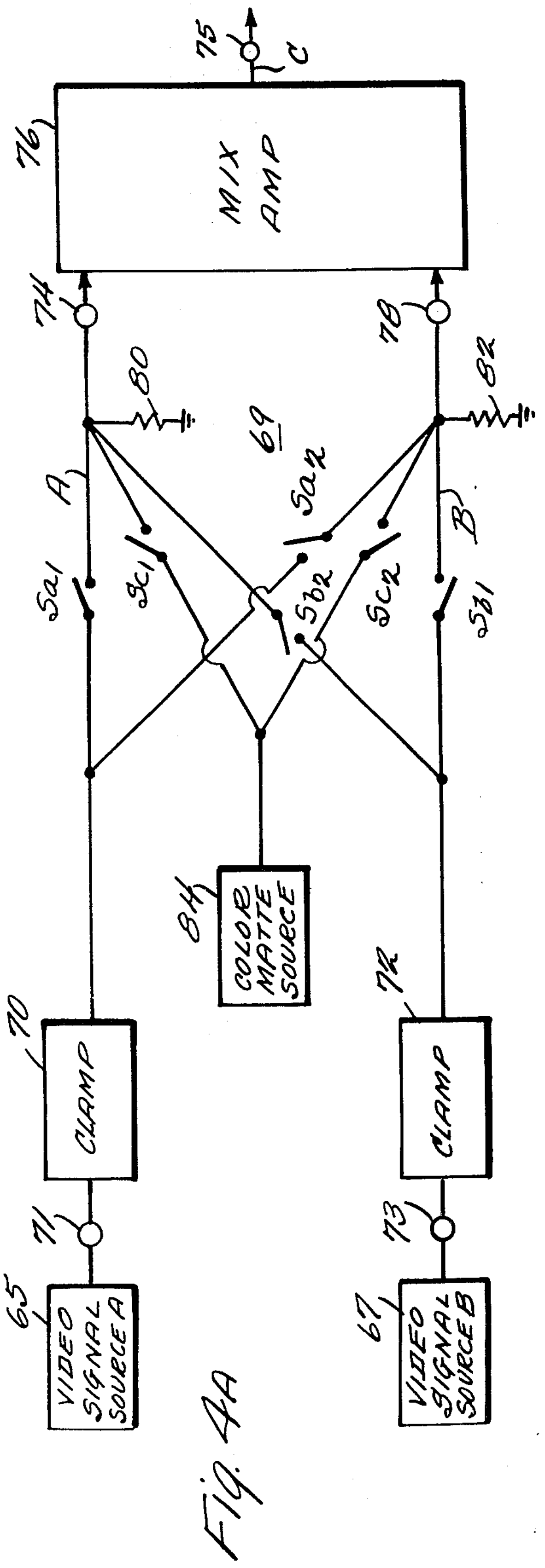
FIGS. 4A and 4B respectively are combined schematic and block diagrams of an illustrative embodiment of switching and control circuitry therefor in accordance with the present invention.

Referring to FIGS. 3 and 4, the terminals 71, 73, and 75 of FIG. 3 respectively correspond to the points 71, 73, and 75 of FIG. 4. Switching circuitry is generally indicated at 69. The switching circuitry includes first and second input terminals 71 and 73 and first and second output terminals 74 and 78. Further, in FIG. 4A, the upper bus is referred to as the A bus and the lower bus is referred to as the B bus while the output bus is referred to as the C bus. Video signal sources 65 and 67 respectively provide video signals A and B. Clamps 70 and 72 are respectively provided in the A and B buses, the purpose of these clamps being to restore the DC level of the video signal applied to the A bus and the DC level of the video input signal applied to the B bus to the same level so that no brightness shift occurs when switching or mixing from one bus to the other. Such clamp circuits are well known and are conventionally employed in conventional special effects circuits. The output of clamp 70 is applied via switch or first switching element $S_{a1}$ to the first input terminal of mixing amplifier 76. This output signal is also applied via switch $S_{a2}$ or second switching element to the second input terminal of mixing amplifier 76. The output signal from clamp 72 is applied also to the second input terminal via switch or third switching element $S_{b1}$ and to the first input terminal via switch or fourth switching element $S_{b2}$. Resistors 80 and 82 provide appropriate input combining impedances to terminals 74 and 78 of mixing amplifier 76. The resistors 80 and 82 would approximate in value those used in conventional special effects amplifiers.

A color matte source 84 is connected to terminals 74 and 78 respectively via switch or fifth switching element $S_{c1}$ and switch or sixth switching element $S_{c2}$. A color matte source is described in copending U.S. application Ser. No. 716,212 filed by the present inventor on Mar. 26, 1968 and entitled "-Combined Hue and Saturation Control" (now U.S. Pat. No. 3,534,157 granted Nov. 13, 1970). The switches $S_{al}$, $S_{a2}$, $S_{b1}$, $S_{b2}$, $S_{c1}$, and $S_{c2}$ are all typically electronic switches such as keyed amplifiers or the like shown in U.S. Pat. No. 2,784,246 granted to W. L. Hurford on Mar. 5, 1957.

Figure 4B:
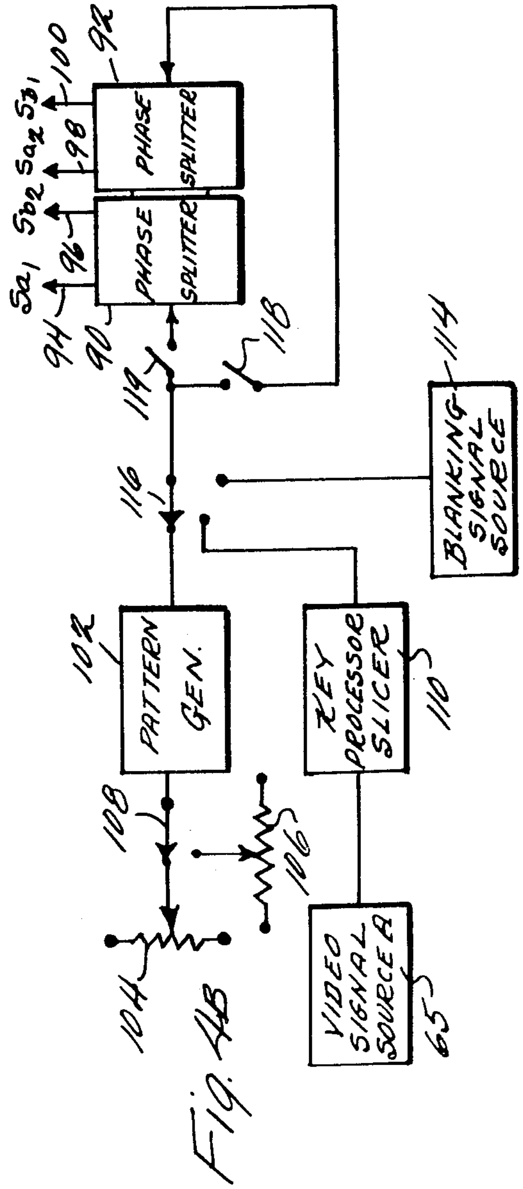

Having now described the elements and the interrelationship thereof of the switching circuit of FIG. 4A, illustrative circuitry for controlling the switching elements will be briefly described with respect to FIG. 4B. Two phase splitters 90 and 92 are connected in parallel and have outputs 94–100. These outputs are respectively connected to switches $S_{a1}$, $S_{b2}$, $S_{a2}$, and $S_{b1}$. Further, the outputs 94 and 96 of phase splitter 90 are also connected to switches $S_{cl}$ and $S_{c2}$ for a special purpose which will be described in more detail hereinafter. The outputs from lines 94 and 98 occur in time synchronism while the outputs from lines 96 and 100 also occur in time synchronism. A conventional pattern generator 102 (such as shown in FIGS. 5, 6, and 7 of U.S. Pat. No. 2, 240,420 granted to B. E. Schnitzer on Apr. 29, 1941operates under the control of a conventional fader potentiometer 104 and preset input 106, switch 108 providing a capability of selecting either control. A conventional key processor slicer 110 (such as shown in the Hurford patent mentioned hereinbefore) is also provided and operated under the control of either of the video input signals A or B, the conventional purpose of such circuitry being to provide a control signal which will permit the insertion of one video signal into another. In one mode of operation of this invention, the A signal is inserted into the B input signal. Also provided is a conventional blanking signal source 114 (such as shown in the Schnitzer patent mentioned hereinbefore) which generates a conventional blanking signal employed in a color black mode of operation which will be described in more detail hereinafter. A mode switch 116 is provided which is operated to select the particular mode of operation for the video switch of FIG. 4A. Thus, depending on the position of switch 116 either the pattern generator 102, or the processor slicer 110, or the blanking signal source 114 is selected. Additional switches 118 and 119 are also provided, the purpose of these switches being described in more detail hereinafter.

The operation of the switching circuitry 69 of FIG. 4A under the control of the circuitry of FIG. 4B will now be described with respect to FIG. 5. Indicated in the left-hand column of the table of FIG. 5 are various modes of operation which the switching circuitry of FIG. 4A is capable of. The next six columns correspond to switches $S_{a1}$ and $S_{c2}$. Within each of these columns a "1" indicates that the corresponding switch is closed, a "0" indicates that the switch is open, and an "X" indicates that the switch is continually switched on and off under the control of a signal generated by either the pattern generator 102, the key processor slicer 110 or the blanking signal source 114 depending upon the mode of operation.

The various modes of operation will now be described. For the mix mode (see the first row of FIG. 5), the switching circuit configuration is static—that is switches $S_{a1}$ and $S_{b1}$ are maintained closed while switches $S_{a2}$ an $S_{b2}$ are maintained open. Although specific circuitry is not shown in FIG. 4B for effecting this setting of the switches, it would be, of course, well within the skill of one having ordinary skill in this art to provide an appropriate switching network which would condition the switches $S_{a1}$ through $S_{b2}$, as described above, whenever the mix mode was selected by the operator at a console or the like. With the switches so conditioned, video input signals A and B are respectively applied to the first and second input terminals of mixing amplifier 76 which produces an appropriate output signal on the C bus. During this mode of operation, switches 118 and 119 are opened.

The split screen mode of operation is effectuated by switching continuously all the switches $S_{a1}$ through $S_{b2}$ as indicated. Further, in FIG. 4B, switch 116 is in the position shown and switches 118 and 119 are closed. Since $S_{a1}$ and $S_{a2}$ are switched from the outputs of lines 94 and 98 respectively and since these outputs are in phase as stated hereinbefore, switches $S_{a1}$ and $S_{a2}$ are operated synchronously or in phase to present the video input signal A to terminals 74 and 78 simultaneously. The signal occurring at the C bus will be the A input signal because the mixing amplifier operation is such that whenever the input signals applied thereto are equal in amplitude, the output signal will be the same as the input signals regardless of the position of the mixing amplifier fader lever. This is well known to those of ordinary skill in this art. Of course, the potentiometers (not shown) respectively associated with the A and B buses must accurately track in order for the C bus signal to be the same as the signals applied to terminals 74 and 78, this also being well known to those of ordinary skill in this art. Since video input signal A is directly applied to terminals 74 and 78, the signals respectively occurring at these terminals are, of course, the same. Thus, during the phase when switches $S_{a1}$ and $S_{a2}$ are closed and $S_{b1}$ and $S_{b2}$ are opened, the input A is switched to the C bus. When switches $S_{b1}$ and $S_{b2}$ are closed by the switching signals occurring at the output lines 96 and 100, the switches $S_{a1}$ and $S_{a2}$ will be opened. Thus, during this time, the video input signal B will be applied to terminals 74 and 78 and since, once again, these signals are the same, the video input signal B will be switched to the C bus. Hence, a split screen effect is brought about on the C bus. That is, during a single horizontal line, the A signal will be switched onto the C bus during the first portion of the line while the B signal will be switched to the C bus during the second portion of the line. Of course, various special effects can be created depending on the pattern generated by the pattern generator 102 and thus the A signal may be switched to the C bus for a differing period of time than the B signal as the raster is scanned downwardly. In summary, the pattern generator produces a repetitive signal, the period of which corresponds to the horizontal line frequency. Further, during a first interval of this repetitive signal, switches $S_{a1}$ and $S_{a2}$ are closed and switches $S_{b1}$ and $S_{b2}$ are opened while during a second interval, switches $S_{b1}$ and $S_{b2}$ are closed and $S_{a1}$ and $S_{a2}$ are opened.

Further, a wipe from a split screen to only the A signal can be effected by continuously increasing with successive frames, the amount of time the A signal is switched to the C bus with respect to the B signal until the A signal is switched to the C bus for the entire duration of all horizontal lines.

The next mode of operation is termed key into mixer. This corresponds to the operation of the circuitry of FIG. 2 where a key as determined by the video input signal A would be inserted into the background picture as determined by video input signal B and applied as one input to the mixer 36 while the other input of the mixer 36 would be the background picture. Thus, by appropriate positioning of the fader lever of the mixer 36, the capability of dissolving from the background to the background with the inserted key such as a title is available. It should be appreciated that this mode is one instance of the special effects into mixer mode of operation discussed hereinbefore. Further, it should be appreciated that the effectuation of this mode of operation is accomplished with significantly less circuitry than that required in the prior art circuitry of FIG. 2. Further, as stated before, no nonsynchronous bypass lines are required as is the case with the prior art circuitry.

As can be seen from the table of FIG. 5, switch $S_{a1}$ is continuously switched on and off as is switch $S_{b2}$ while switches $S_{a2}$ and $S_{b1}$ are respectively maintained opened and closed. Thus, during a first time interval when the output signal on line 94 is effective to close switch $S_{a1}$, the input signal presented to terminal 74 will be video input signal A while applied to the input terminal 78 will be video input signal B. Further, during a second time interval when the output signal on line 96 is b2, to close switch $S_{b2}$, the B input signal will be applied to both terminals 74 and 78. It is to be understood that these first and second time intervals could occur many times during a single horizontal line—that is, whenever the B signal is to be inserted into the A signal. During the second time interval, regardless of the position of the fader lever of mixing amplifier 76, the signal occurring at bus C will be input B. During the first time interval, the signal occurring at bus C will be determined by the position of the fader lever. Hence, if the lever were at or very near the B bus, the signal occurring on bus C would appear to be the input B and since the B signal always occurs on the C bus during the second time interval, the C bus signal will appear to be video input signal B as long as the fader lever is positioned at or very near bus B. However, as the fader lever is moved from the B bus to the A bus, the video input signal B occurring on the C bus is dissolved into a background signal having the video input signal A inserted thereinto as a key such as a title or the like. Hence, when the fader lever is placed at the A bus, only the A signal will occur at the C bus during the first time interval even though the B bus has present thereon the B signal.

During the key into mixer mode of operation, switch 116 of FIG. 4B is set so as to pass the output from key processor slicer 110 into phase splitter 90, switch 119 is maintained closed and switch 118 is maintained opened to prevent phase splitter 92 from exerting any control at this time. The output signal from slicer 110 is repetitive to the extent that the horizontal lines occur at the line frequency and thus, the beforementioned first and second time intervals occur during each cycle of this repetitive signal. The manner in which one of the video input signals to a special effect circuit is used to drive a key processor slicer such as slicer 110 is well known to those of ordinary skill in the art. In particular, the use of the video signal for key insertion such as titles is well known and thus the details of this aspect of the invention are not described in detail.

In the next mode of operation (split screen into mixer which is another instance of the special effects into mixer mode of operation described hereinbefore), the configuration of the switching circuitry 69 is exactly the same as that utilized in the key into mixer mode of operation. The only difference in the modes of operation is that the switch 116 is moved to the position shown in FIG. 4B to allow the pattern generator 102 to drive the phase splitter and thereby generate the necessary control signals for actuating the switches. Thus, with the mixing amplifier fader lever at the B bus, the video input signal B will be applied to the C bus at all times. However, if a dissolve into a split screen is desired, with the A signal being present in one portion of the screen, the fader lever of the mixing amplifier is moved from the B bus to the A bus. With this done, during the first time interval, the A signal only will appear at the C bus and thus the desired split-screen effect is achieved, the particular split-screen pattern depending on the waveform of the repetitive control signal produced by pattern generator 102.

The next mode of operation is a special mode which provides the capability of generating a color black signal. This mode of operation illustrates one feature of the invention which is not available in the prior art mix/effect systems of FIGS. 1 and 2. The color black signal is well known to those of ordinary skill in the art. Basically, this signal contains blanking, sync, color burst (if any) information as in any ordinary television video signal; however, the complete picture portion of the signal is flat and its level corresponds to black. As can be seen in FIG. 5, the switch $S_{a2}$ is continuously switched under the control of the signal occurring at line 98 of phase splitter 92. Thus, during this mode of operation the blanking signal source 114 is connected to phase splitter 92 through switch 116 and switch 118. Further, switch 119 is open. Hence, during the blanking interval, the video input signal A will be applied to both of the terminals 74 and 78 and thus, video input signal A appears at bus C. In particular, only the sync, blanking, and color burst (if any) of the video input signal A occur at bus C. During the picture interval of video input signal A, switch $S_{a2}$ is opened under the control of the blanking signal generated at source 114. Hence, during this time terminal 78 is grounded while applied to terminal 74 is video input signal A. However, during this time the fader lever is positioned to the B bus and thus, the ground level signal is switched to the C bus, thereby removing any picture information from the signal occurring at the C bus and thus, the color black signal is generated.

The next mode of operation indicated in the table of FIG. 5 results also in a color black signal; however, in this mode the video input signal B is employed rather than the video input signal A as in the previous mode. As can be seen from the table, the role of the various switches is changed but corresponds to that of the previous mode. Thus, switch $S_{b2}$ is continuously switched while $S_{a2}$ is maintained in the open condition. Thus, during the picture interval of the B signal, the video input signal B will be applied to terminal 78 while the terminal 74 will be grounded through resistor 80. Since the fader lever will not be set to the A bus, the level on the C bus will correspond to black during the picture interval of the B signal. However, during the blanking interval of the input signal B, the input signal B will be present at both terminals 74 and 78 because switch $S_{b2}$ is closed at that time. Hence, the sync, blanking, and color burst information of this signal will be preserved at the C bus. There are further obvious variations in this black mode of operation in that output line 96 is employed during this mode thereby necessitating the closure of switch 119 and the opening of switch 118 to connect blanking signal source 114 to phase splitter 90.

The next two modes of operation shown in the nonsynchronous. of FIG. 5 relate to the problem discussed hereinbefore which arises whenever the operator applies nonsynchronous signals to the circuitry. As discussed hereinbefore with respect to FIGS. 1 and 2, nonsynchronous bypass lines 51 and 56 (FIG. 1) are required to obviate the problem.

However, the circuitry of FIG. 4A meets the problem without requiring these bypass lines. Hence, with the fader lever set at the A bus, switches $S_{a1}$ and $S_{a2}$ will be closed to cause the input signal A to appear at the C bus assuming the input signals A and B are nonsynchonous. If, however, the fader lever is moved all the way to the B bus, only switches $S_{b1}$ and $S_{b2}$ will be closed to thereby cause the B input to appear at the C bus. The necessary switching circuitry for causing the switches $S_{b1}$ and $S_{b2}$ to close and causing the switches $S_{a1}$ and $S_{a2}$ to open after the fader lever has been moved completely to the B bus has not been shown in the drawing in that such circuitry would be obvious to those of ordinary skill in this art. Further, applicant desires to present his invention in the clearest manner possible without going into unnecessary detailed explanations of matters which would obviously be within the skill of those of ordinary skill in this art.

The last two modes of operation shown in the table correspond to colored key modes which involve the insertion of a colored title into a background picture. This mode of operation essentially corresponds to the key into mixer mode described hereinbefore except that rather than switching switch $S_{a1}$, this switch is opened and $S_{c1}$ is continuously switched. Again, the switch 116 of FIG. 4B would be positioned so as to connect key processor slicer 110 to phase splitter 90 with switch 118 being closed and switch 119 being opened. In this mode of operation, however, output line 94 from phase splitter 90 is applied to switch $S_{c1}$ rather than $S_{a1}$ by appropriate means not shown. Hence, with the fader lever of mixer amplifier 76 set to the A bus, the color signal will be applied to the C bus whenever the video input signal A (corresponding to a key such as a title) causes the output on line 94 to close the switch $S_{cl}$. At all other times, the video signal input B will appear at terminals 74 and 78 thereby placing the B signal on the C bus and thus a colored key such as a title is inserted into the background picture (that is, input signal B).

In the key into mixer mode, the split screen into mixer mode, and the colored key mode, it is to be understood that the roles of the switches $S_{a1}$ through $S_{c2}$ can be reversed as was illustrated with respect to the color black mode (see the table of FIG. 5). In other words, for example, with respect to the key into mixer mode, the input signal A was employed as a key which was inserted into the input signal B which was employed as a background. If it is desired to employ the input signal B as a key which would be inserted into the input signal A which would be employed as a background, the switches $S_{a2}$ and $S_{b2}$ would be continuously switched while switch $S_{a1}$ would be maintained closed and switch $S_{b2}$ opened.

Numerous modifications of the invention will become apparent to one of ordinary skill in the art upon reading the foregoing disclosure. During such a reading it will be evident that this invention provides unique mix/effects circuitry for accomplishing the objects and advantages herein stated.

What is claimed is:

1. A mix/effects system for video signals selectively operable in any one of a plurality of modes including (1) a mix mode,(2a special effects mode including a split screen mode or a key mode, and (3) a combination special effects/mix mode, said system comprising:

a plurality of video signal sources;

a matrix of switching cross points having a plurality of input buses respectively connected to said plurality of video signal sources, said matrix having a plurality of output buses so that any one of said video signal sources can be switched to any one of said output buses;

switching circuitry having two input terminals connected to no more than two of said output buses and having two output terminals, said switching circuitry including a plurality of switching elements;

signal-mixing circuitry having two input terminals respectively connected to said two output terminals of said switching circuitry and having an output terminal, said signal-mixing circuitry having means to control the proportion of the two input signals applied thereto in the output signal; and control means for controlling the configuration of said switching circuitry during said any one mode by statically closing and opening certain ones of said switching elements and by continually switching the remaining ones of said switching elements whereby in response to said switching circuitry configuration and said means for controlling the signal proportions, the two video signals respectively occurring at the two output buses from said matrix can (1) be mixed, or (2) be employed to create a special effects signal or the special effects signal can be mixed with one of the said two video signals.

2. A mix/effects system as in claim 1 where said switching circuitry includes at least first and second input terminals and at least first and second output terminals an including:

A first switching element connecting said first input and first output terminals;

a second switching element connecting said first input and second output terminals;

a third switching element connecting said second input and second output terminals;

a fourth switching element connecting said second input and first output terminals.

3. A system as in claim 2 where said control means includes means for closing said first and third switch elements and for opening said second and fourth switch elements to thereby mix said two video signals.

4. a mix/effects system as in claim 2 where said control means includes control-signal-generating means for generating at least one control signal; and actuating means responsive to said control signal for continuously switching said remaining ones of said switching elements.

5. A system as in claim 4 where said control signal is repetitive, said actuating means in response to the repetitive control signal closing said first and second switch elements and opening said third and fourth switch elements during a first interval of said repetitive control signal and closing said third and fourth switches and opening said first and second switch elements during a second interval of said repetitive control signal whereby said two video signals are alternately applied to said signal-mixing circuitry to thereby generate said special effects signal and place said system in a split-screen mode.

6. Circuitry as in claim 5 where said control-signal-generating means includes means for varying the duty cycle of said first and second intervals of said repetitive signal to place said system in a wipe mode.

7. A mix/effects system as in claim 4 where said control-signal-generating means regenerates at least two control signals, said system including switching means for connecting one of said control signals to said actuating means.

8. A system as in claim 4 where said control means includes means for opening said second switch and for closing said third switch and where said control signal is repetitive, said actuating means in response to the repetitive control signal closing said first switch element and opening said fourth switch element during a first time interval of said repetitive control signal and closing said fourth switch element and opening said first switch element during a second time interval of said repetitive control signal whereby said special effects signal can be mixed with one of said two video signals.

9. A system as in claim 4 where said control means includes means for closing said first switch element and opening said third and fourth switch elements and said control-signal-generating means including means for generating a blanking signal, said actuating in response to said blanking signal closing said second switch element during the blanking interval of said blanking signal and opening said second switch element during the picture interval of said blanking signal and where the input terminal of said signal-mixing amplifier connected to said third switching element is grounded through an impedance, said signal-mixing circuitry being set to pass only the signal applied to said last-mentioned input terminal whereby said system is placed in a color black mode.

10. A system as in claim 4 including a source of color matte signals;

a fifth switch element connecting said color matte signal source to said first output terminal; and a sixth switch element connecting said color matte source to said second output terminal, said control means including means for opening said first, second, and sixth switch elements and closing said third switch element, and said control signal being repetitive, said actuating means in response to the repetitive control signal closing said fifth switch element and opening said fourth switch element during a first time interval of said repetitive control signal and closing said fourth switch element and opening said fifth switch element during a second time interval of said repetitive control signal whereby said system is placed in a colored key mode.

11. A mix/effects system as in claim 8 where said control-signal-generating means is responsive to one of said video signals to thereby effect a key into mixer mode.

12. Mix/effects circuitry comprising:

switching circuitry having at least first and second input terminals and at least first and second output terminals and including:

a first switching element connecting said first input and first output terminals;

a second witching element connecting said first input and second output terminals;

a third switching element connecting said second input and second output terminals;

a fourth switching element connecting said second input and first output terminals;

a mixing amplifier having first and second input terminals respectively connected to said first and second output terminals with first and second signals respectively occurring thereat and having an output terminal having an output signal occuring thereat and means for controlling the proportion in said output signal of said first signal with respect to said second signal whereby mix, key, split-screen, key into mixer, split-screen into mixer and color black modes are in response to the particular configuration of said switching elements and said means for controlling the signal proportions.

13. Circuitry as in claim 12 where said control means includes means for closing said first and third switch elements and for opening said second and fourth switch elements to thereby mix said two video signals.

14. A system as in claim 12 where said control means includes control-signal-generating means for generating at least one control signal; and actuating means responsive to said control signal for continuously switching said remaining ones of said switching elements.

15. Circuitry as in claim 14 where said control signal is repetitive, said actuating means in response to the repetitive control signal closing said first and second switch elements and opening said third and fourth switch elements during a first interval of said repetitive control signal and closing said third and fourth switches and opening said first and second switch elements during a second interval of said repetitive control signal whereby said two video signals are alternately applied to said signal-mixing circuitry to thereby generate said special effects signal and place said system in a split-screen mode.

16. Circuitry as in claim 15 where said control-signal-generating means includes means for varying the duty cycle of said first and second intervals of said repetitive signal to place said system in a wipe mode.

17. Circuitry as in claim 14 where said control means includes means for opening said second switch and for closing said third switch and where said control signal is repetitive, said actuating means in response to the repetitive control signal closing said first switch element and opening said fourth switch element during a first time interval of said repetitive control signal and closing said fourth switch element and opening said first switch element during a second time interval of said repetitive control signal whereby said special effects signal can be mixed with one of said two video signals.

18. Circuitry as in claim 14 where said control means includes means for closing said first switch element and opening said third and fourth switch elements and said control-signal-generating means including means for generating a blanking signal, said actuating in response to said blanking signal closing said second switch element during the blanking interval of said blanking signal and opening said second switch element during the picture interval of said blanking signal and where the input terminal of said signal-mixing amplifier connected to said third switching element is grounded through an impedance, said signal-mixing circuitry being set to pass only the signal applied to said last-mentioned input terminal whereby said system is placed in a color black mode.

19. Circuitry as in claim 14 including a source of color matte signals;

a fifth switch element connecting said color matte signal source to said first output terminal; and a sixth switch element connecting said color matte source to said second output terminal, said control means including means for opening said first, second, and sixth switch elements and closing said third switch element, and said control signal being repetitive, said actuating means in response to the repetitive control signal closing said fifth switch element and opening said fourth switch element during a first time interval of said repetitive control signal and closing said fourth switch element and opening said fifth switch element during a second time interval of said repetitive control signal whereby said system is placed in a colored key mode.